Patented Mar. 27, 1945

2,372,446

UNITED STATES PATENT OFFICE 2,372,446

TALL OIL COMPONENT SEPARATION

Arthur L. Osterhof, Newark, Del., assignor to Hercules Powder Company, Wilmington, Del., a corporation of Delaware No Drawing. Application May 1, 1942,
Serial No. 441,393

7 Claims. (Cl. 260—97.5)

This invention relates to a method for separating fatty and resin acid components of tall oil. More particularly, it relates to the separation of the tall oil components by causing the formation of a resin-phenol condensate and separating the unreacted fatty acids therefrom.

In the manufacture of paper pulp, the wood chips which form the basis of the pulp are acted on by an alkaline liquor which attacks the non-cellulose constituents as, for example, fatty and resin acids and leeches them from the cellulose. The fresh alkaline liquor which is used in this so-called cooking operation is known as the white liquor and the spent liquor of digestion which is drained from the pulp and includes the fatty and resin acids in the form of alkaline soap is known as the black liquor. Upon cooling of the black liquor, the soap separates and floats to the top of the liquor due to the salting out action of the strong alkali. This floating matter is known in the trade as crude tall oil soap. Crude tall oil soap is characterized as being dark brown, impure, and highly ill-smelling. Upon treatment with an acid, this soap yields a less dark brown, viscous, oily product known in the trade as tall oil.

Within limits reported in the literature, tall oil contains 25 to 60% fatty acids, mainly of the oleic series, 25 to 60% resin acids, which may include 50 to 90% abietic acid, and 7 to 20% unsaponifiable material, which may contain phytosterols, lignins, mercaptans, and higher alcohols.

Heretofore separation of the fatty and resin acids of the tall oil was made by means of distillation, however, this method is not satisfactory because of the relative closeness in the boiling points of the components. Further disadvantages of this distillation method include equipment corrosion which occurs during the distillation process, and partial destruction of the relatively commercially valuable fatty and resin acid components.

In accordance with this invention, effective separation of the components of tall oil comprising resin acids and fatty acids is accomplished by the condensation of the tall oil resin acid components with phenol in the presence of a suitable catalyst to form high boiling resin-phenol condensates, thereby enabling the relatively unreactive fatty acid components of tall oil to be separated from the resin-phenol condensate by any suitable means as, by distillation.

More particularly, the concentration of the components of tall oil is accomplished by treating the tall oil with the phenol, with or without the presence of an inert organic solvent, and by heating the phenol-tall oil mixture in the presence of a suitable catalyst, preferably an aromatic sulfonic acid. Following a suitable reaction period which permits the formation of a resin-phenol condensate, the mixture is water-washed and/or distilled to remove any catalyst, solvent present, and unreacted phenol. The treated tall oil is then subjected to distillation, preferably in vacuo, to separate the volatile fatty acids from the relatively non-volatile resin-phenol condensate.

The method in accordance with this invention is illustrated by the following specific examples:

EXAMPLE 1

Treatment with phenol 450 g. of tall oil having a color of D on the rosin color scale was treated with 100 g. of phenol and 2 g. of para-toluene-sulfonic acid at a temperature of 130–150° C. for 17 hours. The mixture was cooled, dissolved in 600 cc. of benzene, then water-washed at 25° C. to 30° C. until the washings were neutral to litmus. The solvent, benzene, was evaporated by distillation, employing a final bath temperature of 225° C. and a pressure of 20 mm. of mercury. A residue of 435 g. was obtained.

The above residue was distilled under vacuum at 20 mm. pressure with the following results: 7.5 g. of phenol distilled over below a vapor temperature of 150° C. 200 g. of light amber colored oil then distilled over at a vapor temperature of 220° C. to 240° C., which consisted of concentrated fatty acids and 220 g. of hard dark-colored resin grading B on the rosin color scale remained in the still.

EXAMPLE 2

Treatment with cresol 500 g. of tall oil having a color of D on the rosin color scale was treated with 150 g. of a technical mixture of cresol and 2.5 g. of para-toluenesulfonic acid at a temperature of about 200° C. for a period of 7 hours. The reaction mixture was dissolved in 500 cc. of toluene and washed with water at 70° C. until the washings were neutral to litmus. The toluene solvent and excess cresol were removed from the mixture by distillation under reduced pressure at 20 mm. of mercury. A residue of 510 g. was obtained.

The above residue was distilled under vacuum at 20 mm. of mercury with the following results: 220 g. of concentrated fatty acid grading M in color was obtained. 250 g. of solid resin having a color of B on the rosin color scale remained in the still. The ratio of fatty to resin acids in the original tall oil was 1.64 and the ratio of fatty to resin acids in the concentrated fatty acids recovered from the treated tall oil mixture was 8.5.

EXAMPLE 3

Treatment with naphthol 400 g. of a liquid rosin having a color of D on the rosin color scale was treated with 100 g. of naphthol and 5 g. of para-toluenesulfonic acid at a temperature of 130–150° C. for 17 hours. The mixture was cooled, dissolved in 600 cc. of benzene, then water-washed at 25–30° C. until the washings were neutral to litmus. The solvent was evaporated by distillation, employing a final bath temperature of 225° C. and at a pressure of 20 mm. of mercury. A residue of 450 g. was obtained.

The above residue was distilled under vacuum at a pressure of 20 mm. of mercury with the following results: 210 g. of light amber colored oil distilled over at a vapor temperature of 220° C. to 265° C., which oil consisted of concentrated fatty acids, and 230 g. of hard dark-colored resin grading B on the rosin color scale remained in the still.

EXAMPLE 4

Treatment with resorcinol 400 g. of tall oil having a color of D on the rosin color scale was treated with 100 g. of resorcinol and 2 g. of para-toluenesulfonic acid at a temperature of 160° C. for 12 hours. The mixture was cooled, dissolved in 600 cc. of benzene, then water washed at 25–30° C. until the washings were neutral to litmus. The solvent was evaporated by distillation, employing a final bath temperature of 210° C. at a pressure of 20 mm. of mercury. A residue of 460 g. was obtained.

The above residue was distilled under vacuum at a pressure of 20 mm. of mercury to give 200 g. of light amber colored oil which distilled over at a vapor temperature of 220° C. to 250° C., and consisted of concentrated fatty acids, and 250 g. of hard dark colored resin grading B on the rosin color scale which remained in the still.

EXAMPLE 5

Treatment with anthranol 400 g. of tall oil having a color of D on the rosin color scale was treated with 100 g. of anthranol and 10 g. of para-toluenesulfonic acid at a temperature of 180° C. for 12 hours. The mixture was cooled, dissolved in 600 cc. of benzene, then water washed until the washings were neutral to litmus. The solvent was evaporated by distillation, employing a final bath temperature of 220° C. and a pressure of 20 mm. of mercury. A residue of 470 g. was obtained.

The above residue was distilled under vacuum at a pressure of 20 mm. of mercury to give 210 g. of light amber colored oil which distilled over at a vapor temperature of 220° C. to 250° C. and consisted of concentrated fatty acids, and 250 g. of hard, dark colored resin having a color of B on the rosin color scale remained in the still.

In carrying out the methods in accordance with this invention, it will be desirable to first remove any solid matter and water from the tall oil. Treatment with a catalyst and a phenol will then be carried out with either the tall oil itself or tall oil dissolved in a suitable solvent. Generally, any water-immiscible solvent for the tall oil may be employed. Suitable solvents comprise any saturated petroleum hydrocarbons such as hexane, gasoline, petroleum ether, propane, butane, pentane, etc. Other suitable solvents which are sufficiently inert under the reactions of this invention are benzene, toluene, xylene, etc. In addition, solvents such as ethylene dichloride, chloroform, monochlorobenzene, are operable. Saturated cyclic hydrocarbons such as cyclohexane, decahydronaphthalene, para-menthane, may also be employed.

Treatment of the tall oil itself or tall oil dissolved in a suitable solvent may be made in the presence of a suitable catalyst with ordinary phenol. Other phenols found operable are ortho cresol, meta cresol, para cresol, thymol, carvacrol, etc. Various polyhydric phenols are also found suitable for the purposes of this invention such as the dihydroxy benzenes, as, for example, catechol, resorcinol, hydroquinone and derivatives of these dihydroxy benzenes. Still other phenols found suitable for this invention are the trihydroxy benzenes as, for example, pyrogallol; the naphthols as, for example, alpha and beta naphthol; anthranol, retinol, para-tertiary butyl phenol, etc. Phenyl ethers which may be used in this invention are anisole, phenetole, and diphenyl ether.

The ratio of phenol to tall oil may vary from about 10% to about 50%, depending upon the molecular weight, reactivity, etc. of the phenol. The reaction temperature may vary from about 50° C. to about 300° C. and is preferably about 75° C. to about 200° C. The reaction time may vary from about 0.25 hours to 25 hours or more, depending upon the temperature employed and the reactivity of the phenol used, and the kind of catalyst employed. The quantity of catalyst may vary from about 0.1 to about 10% and is preferably about 0.5 to about 5%.

Catalysts found suitable for this invention consist of various mono and polysulfonic acids of benzene, toluene, xylene, naphthalene, phenanthrene, retene, ethane, camphor and phenol or the halogenated and alkoxyl substitution products of these compounds. Other suitable catalysts are sulfonic acids of dehydroabietic acid, acetic acid and succinic acid or their esters, anhydrous aluminum chloride, anhydrous stannic chloride, anhydrous zinc chloride, anhydrous titanium chloride, sulfuric acid, alkyl sulfuric acid, acyl sulfuric acid, phosphoric acid, tetraphosphoric acid, phosphoric anhydride, sodium acid sulfate, boron trifluoride and its organic complexes, etc. The simple aromatic monosulfonic acids such as benzene sulfonic acid, and para-toluene sulfonic acid are particularly suitable for the present invention because of their low cost and efficient action.

Following the reaction period between the phenol, and tall oil, in the presence of a catalyst, the mixture may be water washed to remove the catalyst. When the phenol and tall oil treatment is carried out in a solvent, the solvent and the unreacted phenol may be removed by any suitable means as, for example, distillation. Where tall oil is treated with a phenol without the presence of a suitable solvent, the resulting reaction mixture may be dissolved in a suitable solvent for purposes of reducing the viscosity of the reaction mixture during the water washing step. Hot water is preferable to cold water for washing effectively. After removal of the catalyst by means of the water washing step and removal of the solvent by means of distillation, the resulting treated tall oil may then be subjected to a distillation operation preferably under diminished pressure to separate the volatile fatty acids from the non-volatile resin-phenol condensates.

The fatty acids may be used as such in the fatty acid art or they may be refined according to well known procedures prior to use.

The residue condensate may be employed as a resin in the varnish field as such, or the condensate may be reacted with formaldehyde according to well known procedures prior to use.

In accordance with this invention, a novel method of separating the components of tall oil has been devised whereby light colored fatty acids may be recovered from crude tall oil and a resin condensate may also be obtained.

What I claim and desire to protect by Letters Patent is:

1. In the method for the separation of the fatty acid component from tall oil, the steps which comprise heating tall oil and a phenol in the presence of an aromatic sulfonic acid to form a phenol condensate with the resin acid component, said sulfonic acid being present in an amount between about 0.1% and about 10% by weight of the tall oil, and separating the fatty acid component from said condensate by vacuum distillation.

2. In the method for the separation of the fatty acid component from tall oil, the steps which comprise heating tall oil and a cresol at a temperature between about 50° C. and about 300° C. in the presence of an aromatic sulfonic acid to form a phenol condensate with the resin acid component, said sulfonic acid being present in an amount between about 0.1% and about 10% by weight of the tall oil, and separating the fatty acid component from said condensate by vacuum distillation.

3. In the method for the separation of the fatty acid component from tall oil, the steps which comprise heating tall oil and phenol at a temperature between about 50° C. and about 300° C. in the presence of an aromatic sulfonic acid to form a phenol condensate with the resin acid component, said sulfonic acid being present in an amount between about 0.1% and about 10% by weight of the tall oil, and separating the fatty acid component from said condensate by vacuum distillation.

4. In the method for the separation of the fatty acid component from tall oil, the steps which comprise heating tall oil and resorcinol at a temperature between about 50° C. and about 300° C. in the presence of an aromatic sulfonic acid to form a phenol condensate with the resin acid component, said sulfonic acid being present in an amount between about 0.1% and about 10% by weight of the tall oil, and separating the fatty acid component from said condensate by vacuum distillation.

5. In the method for the separation of the fatty acid component from tall oil, the steps which comprise heating tall oil and a cresol at a temperature between about 50° C. and about 300° C. in the presence of benzene sulfonic acid to form a phenol condensate with the resin acid component, the benzene sulfonic acid being present in an amount between about 0.1% and about 10% by weight of the tall oil, removing the benzene sulfonic acid, and separating the fatty acid component from said condensate by vacuum distillation.

6. In the method for the separation of the fatty acid component from tall oil, the steps which comprise heating tall oil and phenol at a temperature between about 50° C. and about 300° C. in the presence of para-toluene sulfonic acid to form a phenol condensate with the resin acid component, the para-toluene sulfonic acid being present in an amount between about 0.1% and about 10% by weight of the tall oil, removing the catalyst, and separating the fatty acid component from said condensate by vacuum distillation.

7. In the method for the separation of the fatty acid component from tall oil, the steps which comprise heating tall oil and resorcinol at a temperature between about 50° C. and about 300° C. in the presence of para-toluene sulfonic acid to form a phenol condensate with the resin acid component, the para-toluene sulfonic acid being present in an amount between about 0.1% and about 10% by weight of the tall oil, removing the catalyst, and separating the fatty acid component from said condensate by vacuum distillation.

ARTHUR L. OSTERHOF.